Dec. 16, 1930.  W. E. SHIVELY  1,785,657
PNEUMATIC TIRE
Filed May 5, 1926

Inventor
Walter E. Shively.
By
Attorney

Patented Dec. 16, 1930

1,785,657

UNITED STATES PATENT OFFICE

WALTER E. SHIVELY, OF AKRON, OHIO, ASSIGNOR TO THE GOODYEAR TIRE & RUBBER COMPANY, OF AKRON, OHIO, A CORPORATION OF OHIO

PNEUMATIC TIRE

Application filed May 5, 1926. Serial No. 106,914.

My invention relates to pneumatic tires and a method of building the same, and it has particular relation to a novel bead construction which may be utilized in the so called "flat built" method of fabricating tires.

One object of my invention is to provide a bead which may be employed on a drum whose edges extend axially outwardly and are of diminishing peripheral diameter.

Another object of my invention is to provide a bead which may be accurately and readily positioned upon a drum of the above designated character.

In a copending application, Serial Number 106,915, filed May 5, 1926, and assigned to The Goodyear Tire & Rubber Company, I have described a drum having certain novel characteristics by means of which it is possible to assemble the several elements which constitute a tire with an exacting precision and in less time than has been possible heretofore. The present invention is related to the former in that it pertains to a bead and method of tire fabrication which are employed in conjunction with a drum having the characteristics hereinabove set forth.

According to the "core-built" method of building tires, the structural elements embodied in a tire are assembled in a relation which is substantially the same as they have in the finished product. Certain flat-built methods of building tires are to a certain extent likewise so characterized, particularly that described in Patent No. 1,242,073. According to the present invention, the bead is not assembled in the same relative position that it holds in the finished tire, but must be turned through an angle of substantially 90°.

A better understanding of my invention may be had by referring to the drawings, in which.

Figure 1:
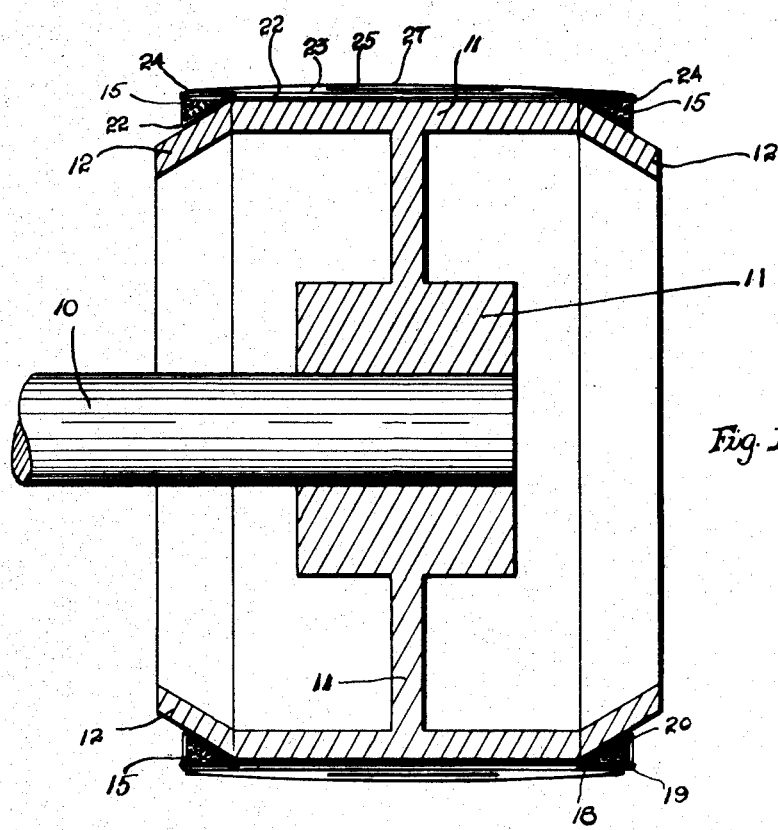
Fig. 1 is a cross-sectional view of a drum of a tire building machine together with bead and fabric portions of a tire casing assembled thereon, in accordance with the principles of my invention.

The distinguishing feature of the drum, which is employed in practicing my invention, resides in the edge portions which are beveled outwardly. This is illustrated in Fig. 1, wherein a drive shaft 10 of a tire building machine supports a drum 11 whose edge portions 12 are of diminishing peripheral diameter.

A bead of a tire consists of a central ring or core portion 15, which may consist wholly of an elastic material, such as a rubber composition, or may include an inelastic material, such as wire 16, which is insulated by a suitable hard rubber composition. The core is enclosed by cross-woven fabric material 17, after which the article is subjected to a semi-cure, to give it a definite shape. Numerals 18, 19, and 20 designate the top, heel and toe of a bead, respectively. That portion of the bead which extends from the heel to the toe is often referred to as the base of the bead. In a finished tire, the top of the bead extends into the side-wall portion, whereas the base of the bead forms the inner periphery of the tire.

According to present day practice the bead is molded in a manner whereby the several parts thereof assume the same relative positions which they possess in the finished product. In other words, the top of the bead forms the outer periphery, and is of maximum diameter. On the other hand, the base is parallel to the axis of the bead and forms its inner periphery. By referring to the drawings, it will be noted that a bead constructed according to the principles of my invention differs from previously employed structures in that the base is perpendicular to the axis of the bead, whereas the side of the bead which extends from the top to its heel forms the outer periphery.

To build a tire embodying a bead of this construction, the operator applies a thin coating of cement to the surface of the drum in order to improve its adhesive qualities. One or more plies of rubberized fabric 22 are subsequently placed about the surface of the drum and the edge portions are stitched down to conform to the contour thereof. The beads are then positioned upon the beveled portion substantially as illustrated in Fig. 1. It will be noted that the angle at the toe of the bead is a complement of that of the bevel, as a result of which the outer periphery of the bead forms a cylindrical surface approximately continuous with the flat portion of the drum.

After the beads have been positioned upon the drum the excess fabric which according to former practice, would have been stitched along the beveled portion is turned up about the heel portion, after which one or more additional plies of fabric 23 are superimposed about the drum, and the edge portions are caused to tie in the bead, as indicated by numeral 24. The breaker 25, chafing strips, and tread portions 27 are aligned successively and stitched in their final position, after which the drum is collapsed and the assembled product removed.

Figure 2:
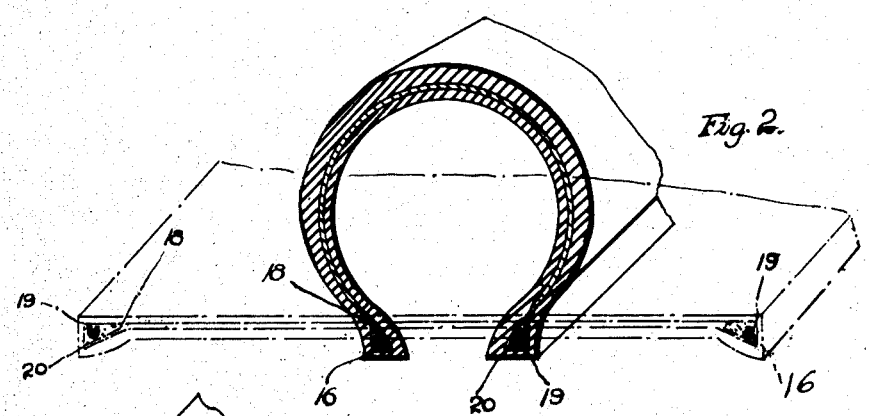
Fig. 2 is a transverse section of a tire casing illustrating the various portions thereof in their initial and final positions, as a result of the shaping operation.
Figure 3:
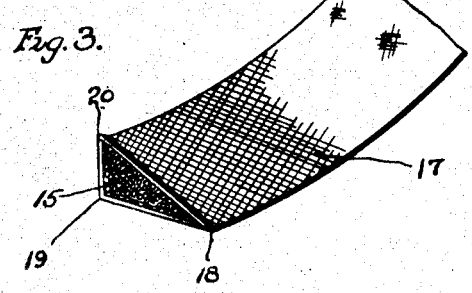
Fig. 3 is a perspective view of a portion of a bead embodying the principles of my invention.

The article is then shaped, whereby that portion of the tire which was aligned with the flat surface of the drum is caused to bulge outwardly in the manner illustrated in Fig. 2. At the same time the bead portions are drawn together and rotated through substantially 90° with their metallic reinforcing medium as the axis of rotation. It will be noted that as a result of the shaping operation, the base of the bead is no longer the outer edge of the flat fabricated band, but forms the inner periphery of the shaped tire. Obviously when the bead is of inextensible character the metallic portion retains its dimension. Rotatory movement, therefore, must be effected with the braided or twisted wire as the center of rotation. When the bead is of extensible character, the axis of rotation is not defined as accurately, though the margin of variation is not material.

By utilizing a bead which is constructed according to the principles of my invention, it is possible to position the same more accurately upon the beveled porton of the drum. It will be noted that the relatively tacky bead does not come into contact with the rubberized fabric until it has reached its final position. As a result, no distortion of the fabric is possible. Moreover, the difficulties which are incident to the stitching and tying in operations, that characterize former methods, are obviated. This has been made possible by the fact that the several elements are at all times under observation and the stitching and tying in operations are performed without obstruction from the structural elements of the machine. As a result, the method which is made possible by the bead hereinabove described is inducive, by its simplicity, of a greater output per building unit without impairing the quality of the product.

Although I have described but a single embodiment of the principles of my invention, it will be obvious to those skilled in the art that many slight changes may be made without departing from the spirit thereof, and I desire that it be limited to accord only with prior art and the appended claims.

What I claim is:

1. A method of manufacturing pneumatic tires which comprises shaping an inner fabric band to have a substantially cylindrical intermediate portion and outwardly beveled edge portions, applying molded semi-cured beads to the beveled edges of the fabric by moving them axially of the fabric band, applying additional bands of fabric and a tread band to complete the assembly of the tire, stitching the bands together and about the beads, expanding the tread portions of the tire and at the same time causing the beads to rotate about their circumferential axes to the position they normally assume in the finished tire.

2. A method of manufacturing pneumatic tires which comprises shaping an inner fabric band to have a substantially cylindrical intermediate portion and outwardly beveled edge portions, applying molded beads to the beveled edges of the fabric by moving them axially of the fabric band, applying additional bands of fabric and a tread band to complete the assembly of the tire, stitching the bands together and about the beads, expanding the tread portions of the tire and at the same time causing the beads to rotate about their circumferential axes to the position they normally assume in the finished tire.

3. A method of manufacturing pneumatic tires which comprises shaping an inner fabric band to have a substantially cylindrical intermediate portion and outwardly beveled edge portions, applying preformed bead units having inner peripheries which substantially mate with the marginal portions of the fabric by moving the beads axially of the fabric band, turning the edges upwardly about the bead, applying additional bands of fabric and a tread band to complete the assembly of the tire, stitching the edges of the last mentioned band downwardly about the beads, expanding the tread portions of the tire and at the same time causing the beads to rotate about their circumferential axes to the position they normally assume in the finished tire.

In witness whereof, I have hereunto signed my name.

WALTER E. SHIVELY.